(12) United States Patent
Offredi et al.

(10) Patent No.: US 10,679,572 B2
(45) Date of Patent: Jun. 9, 2020

(54) DIGITAL DISPLAY APPARATUS

(71) Applicant: BAE SYSTEMS plc, London (GB)

(72) Inventors: Matthew Frank Offredi, Rochester (GB); Luke Severino Offredi, Rochester (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 16/092,945

(22) PCT Filed: Mar. 30, 2017

(86) PCT No.: PCT/GB2017/050888
§ 371 (c)(1),
(2) Date: Oct. 11, 2018

(87) PCT Pub. No.: WO2017/178792
PCT Pub. Date: Oct. 19, 2017

(65) Prior Publication Data
US 2019/0244571 A1    Aug. 8, 2019

(30) Foreign Application Priority Data

Apr. 11, 2016   (GB) .................................. 1606078.2

(51) Int. Cl.
*G09G 3/34*       (2006.01)
*G09G 5/397*      (2006.01)
(Continued)

(52) U.S. Cl.
CPC ......... *G09G 3/346* (2013.01); *G02B 26/0841* (2013.01); *G09G 3/2007* (2013.01);
(Continued)

(58) Field of Classification Search
None
See application file for complete search history.

(56) References Cited

U.S. PATENT DOCUMENTS

2002/0196252 A1\* 12/2002 Liao ..................... G06T 15/40
                                                                 345/422
2003/0122773 A1\*  7/2003 Washio ................ G09G 3/3648
                                                                 345/103
(Continued)

FOREIGN PATENT DOCUMENTS

| EP | 2207159 | 7/2010 |
| WO | 2013/140143 A1 | 9/2013 |
| WO | 2017/178792 A1 | 10/2017 |

OTHER PUBLICATIONS

International Search Report and Written Opinion received for PCT Application No. PCT/GB2017/050888. dated May 10, 2017. 13 pages.
(Continued)

*Primary Examiner* — Said Broome
(74) *Attorney, Agent, or Firm* — Finch & Maloney PLLC

(57) ABSTRACT

A method for controlling a digital display device (105), such as a digital micro-mirror device, and a digital display apparatus (101, 106) are provided in which, in order to meet the latency requirements of the display, each frame of received image symbology data is divided into several subframes. A tag is assigned to an incoming drawing command, the tag having an initial value equal to the number of subframes in a frame. The drawing command is rendered on the first subframe and the tag is decremented by one. The drawing command is rendered again on subsequent subframes and the tag value is decremented by one each time the drawing is rendered. When the tag value reaches zero, the drawing command is discarded. Thus, a line may be rendered with lower latency compared with known systems which refresh on a frame-by-frame basis.

20 Claims, 2 Drawing Sheets

Figure 1:
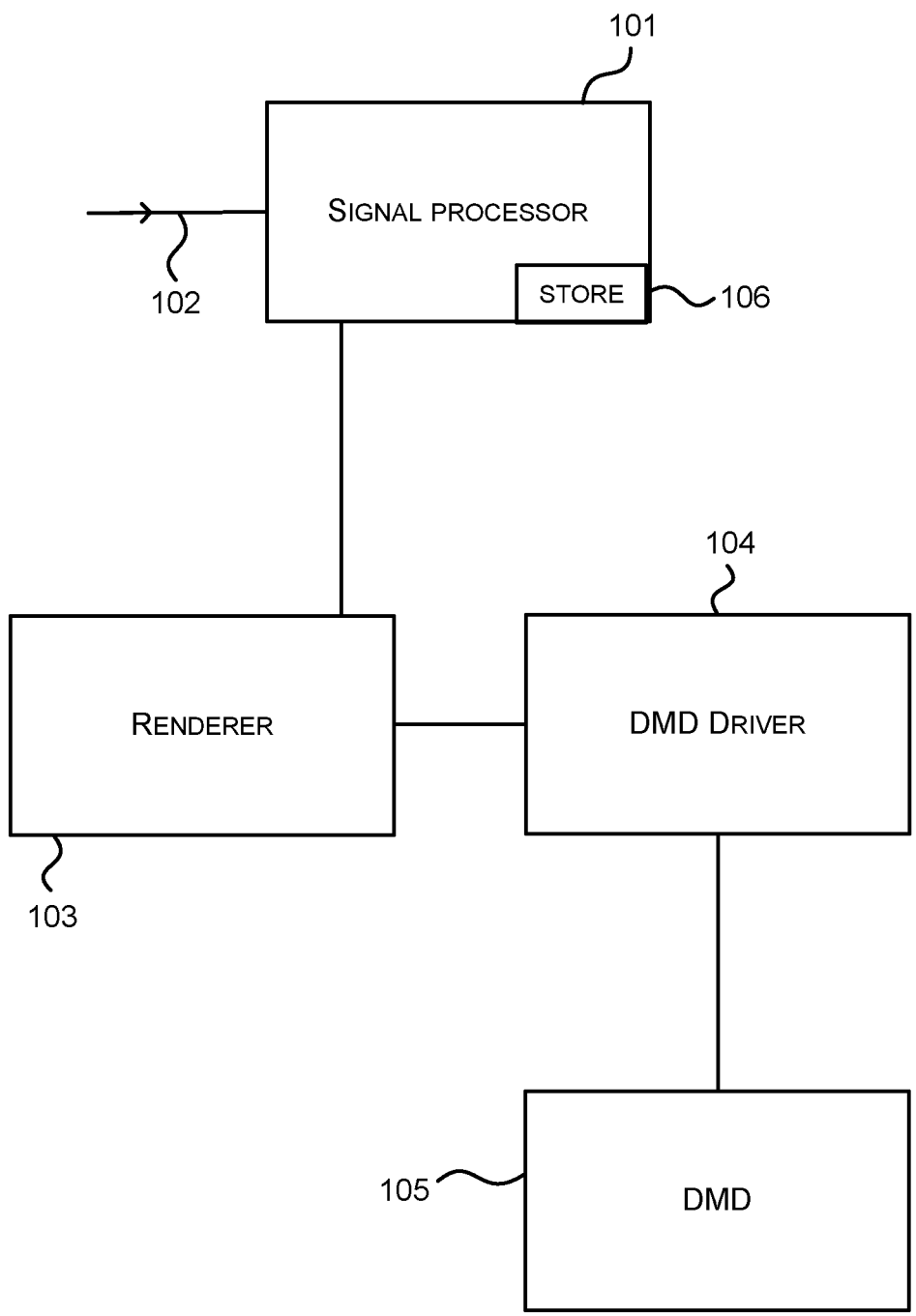

(51) Int. Cl.
*G09G 3/20* (2006.01)
*G09G 5/20* (2006.01)
*G02B 26/08* (2006.01)

(52) U.S. Cl.
CPC ............... *G09G 5/20* (2013.01); *G09G 5/397* (2013.01); *G09G 2310/04* (2013.01)

(56) References Cited

U.S. PATENT DOCUMENTS

2013/0241938 A1* 9/2013 Gruber .................... G06T 11/40
                                                                                                   345/501
2015/0009203 A1 1/2015 Fulton

OTHER PUBLICATIONS

GB Search Report under Section 17(5) received for GB Application No. 1606078.2, dated Aug. 12, 2016. 3 pages.
International Preliminary Report on Patentability received for PCT Application No. PCT/GB2017/050888. dated Oct. 25, 2018. 8 pages.

* cited by examiner

DIGITAL DISPLAY APPARATUS

This invention relates to digital displays and in particular, but not exclusively, to a method and apparatus for controlling the display of images in digital display devices, for example digital displays based upon a digital micro-mirror device (DMD). However, the principles of operation of the present invention may be applied advantageously to other types of digital display device.

A DMD comprises an array of micro-mirrors (typically 1280×1024) which can be individually and selectively activated by controlling the angle at which they reflect incident light. An array of micro-mirrors corresponds to an array of pixels in an image to be displayed. In an 'on' state a mirror reflects light for displaying a pixel of an image towards a viewer and in an 'off' state the mirror reflects the light to a light dump. Each micro-mirror in the array has a memory cell associated with it, the memory function comprising part of an image rendering pipeline. One known application of a DMD is that of symbology rendering whereby in response to drawing commands, the DMD displays lines and symbols such as an artificial horizon symbol or a target cross-wire. A DMD has an 'update period' which may vary from one type of device to another or may be selected by a system designer dependent on the required performance of the system. The DMD update period is the time period during which the micro-mirrors can be controlled to be switched to or held in either an 'on' state or an 'off' state. By way of example, a typical DMD update period may be between 200 μs and 600 μs so that each of the mirrors may be controlled to change state every 200 μs to 600 μs. A display is required to maintain each pixel of an image for a minimum period—an 'image refresh period' to allow proper perception by a human observer. An image refresh period of 16 or 20 ms is typical and represents a time period less than the minimum period during which a human eye is able to perceive a change in pixel luminance or colour. Accordingly, the state of each pixel represented in the DMD can be changed many times during a refresh period and the eye will integrate the discrete periods of illumination to result in a single perceived luminance level over that image refresh period. For example, a DMD update period of 572 μs allows the state of a mirror to be changed 35 times and perceived illumination levels to be achieved using predetermined combinations of those 35 mirror state changes during a refresh period of 20 ms.

Conventional methods for controlling the state of the micro-mirrors in a DMD device to render an image operate on a frame-by-frame basis, the image data required to define the pixels for the image in each frame being determined in time for the beginning of typically a 16 to 20 ms 'frame period' or 'image refresh period'. The pixel luminance and colour to be displayed in a given frame needs to be uploaded to a DMD 'driver' in time for the beginning of a respective frame period and a predetermined pattern of mirror modulation is applied by the DMD driver in respect of each pixel during that frame period to ensure that pixels of the required luminance and colour (if the image is a colour image) may be perceived for that image frame by a viewer. However, one difficulty with this approach is that updates to an image to be displayed, for example the appearance of a new element of a cursively drawn symbol in the image, cannot be introduced into the image being displayed until the beginning of the next 20 ms frame period. In some applications such a delay is unacceptable.

In a first aspect, the present invention comprises a method for controlling a digital display device to display an image, the method comprising: on a first rendering cycle, receiving data representing an image to be displayed; assigning to said data, a tag having a value equal to a pre-determined integer; outputting said data for rendering and decrementing the value of the assigned tag by one; and on a subsequent rendering cycle, if the value of the assigned tag is greater than zero, outputting the data for re-rendering and further decrementing the value of the tag by one.

In one embodiment, data having an assigned tag whose value is equal to zero is discarded.

Received data and their assigned tag values (which may or may not have been decremented) may be stored and then selected for rendering or re-rendering on subsequent rendering cycles.

The digital display device may be a DMD device, for example.

The received data may comprise image symbology data received as a drawing command which may result, once rendered, in a line being drawn on a display. A 'rendering' cycle may be chosen to be 1.8 ms, for example. In this example, nine such subframes would make up a typical frame duration (of around 16 ms) which is equal to a typical refresh period as mentioned above. Thus, a line (or several lines) may be rendered every 1.8 ms as opposed to every 16 ms to 20 ms in the case of known systems which refresh on a frame-by-frame basis. Other values for subframe duration are possible and in general, the initial value of the assigned tag (i.e. the pre-determined integer mentioned above) may be the number of subframes (or rendering cycles) in a frame.

By virtue of the invention, the inherent low latency of a DMD device can be exploited. Instead of rendering lines and symbols on a frame by frame basis, the invention provides almost a continuum of renderings. That is to say that, Instead of waiting for a whole frame before an image can be drawn, drawing commands received in a time window (the rendering period or subframe) which is a fraction of a frame are rendered. Then, the next set of drawing commands coming in the following subframe are rendered along with the ones previously rendered so that there is adequate persistence of the displayed image. Hence, the assigned tag may be thought of as a persistency value. A maximum persistency value can be pre-chosen and applied to each new, incoming drawing command.

The rendering process may be carried out using known techniques.

In a second aspect, the present invention provides a digital display apparatus comprising a signal processor arranged to: on a first rendering cycle, receive data representing an image to be displayed; assign to said data, a tag having a value equal to a pre-determined integer; output said data for rendering and decrement the value of the assigned tag by one; and on a subsequent rendering cycle, if the value of the assigned tag is greater than zero, output the data for re-rendering and further decrement the value of the tag by one.

The signal processor may be implemented in an integrated circuit.

The signal processor may include a store for storing received data and assigned tag values In a third aspect, the present invention provides a digital display device incorporating or associated with a signal processor which is arranged to implement the method according to any embodiment of the first aspect of the present invention.

In a fourth aspect, the present invention provides a digital display device controllable according to the method defined according to any embodiment of the first aspect of the present invention.

The present invention may be applied similarly to other types of digital display device (other than a DMD), as would be apparent to a notional skilled person in the field.

Figure 2:
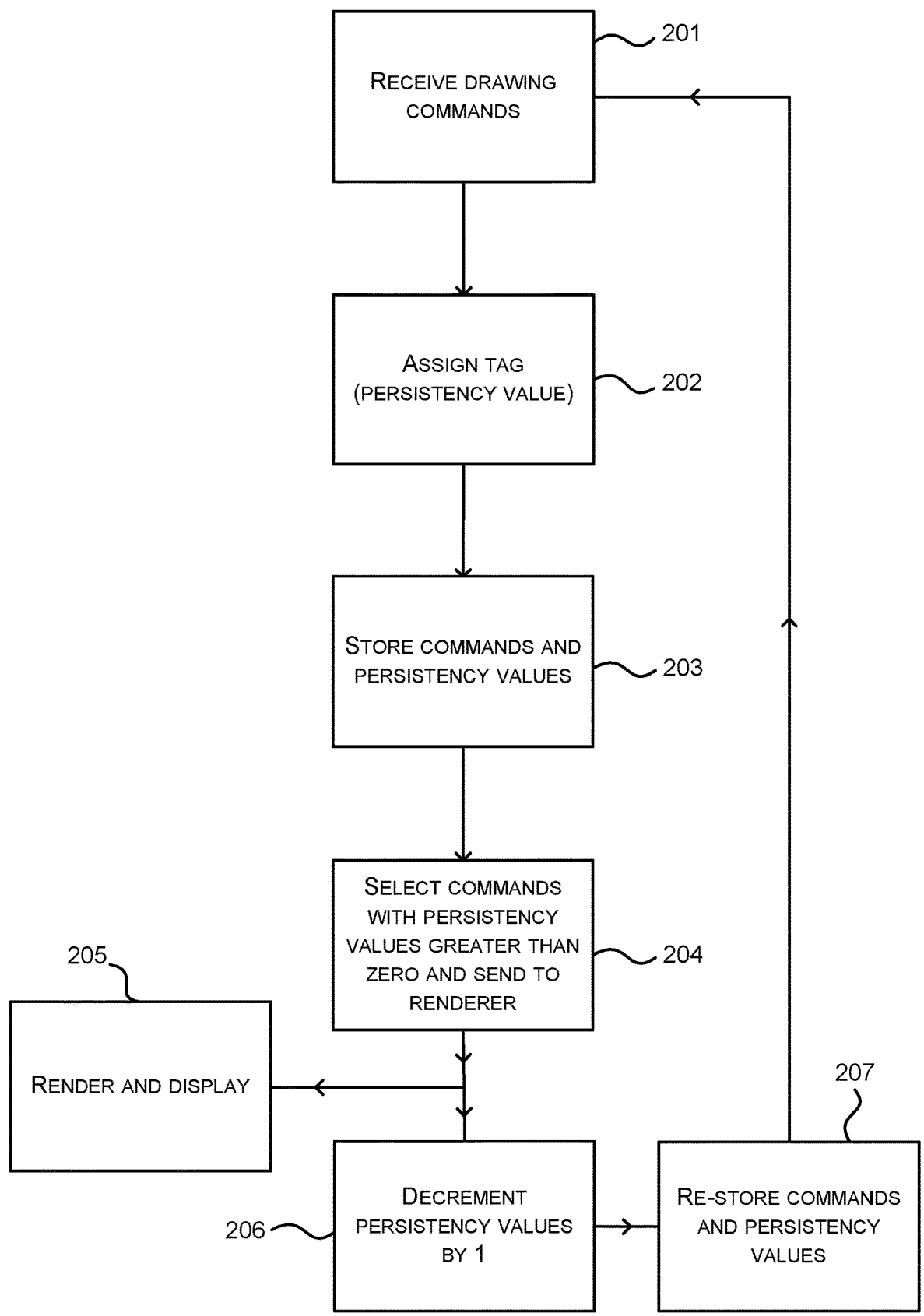

Example embodiments of the present invention will now be described in more detail with reference to the accompanying drawings, of which:

FIG. 1 is a simplified, schematic block diagram of a display system incorporating digital display apparatus according to one example embodiment of the present invention; and FIG. 2 is a simplified flowchart illustrating a method for controlling a digital display device according to one example embodiment of the present invention and which may be performed by the display system Illustrated in FIG. 1.

Referring initially to FIG. 1, a display system 100 includes a signal processor 101 which receives data on an input line 102. In one example, the data comprises drawing commands. Drawing commands are continually fed into the signal processor 101 which assigns a tag value to each incoming command and stores the drawing commands and tag values. An output of the signal processor 101 is coupled to an input of a renderer 103 and the signal processor 101 outputs selected drawing commands for rendering. The renderer 103 has an output which is coupled to an input of a DMD driver 104. An output of the DMD driver 104 is coupled to a DMD 105. The renderer 103, the DMD driver 104 and the DMD 105 may be of conventional design and operate such that drawing commands output by the signal processor 101 are displayed as line drawings or symbols, for example, on the DMD 105 for viewing by a user. The signal processor 101 is provided with a store 106 for storing the received data and their assigned tag values.

A method for controlling a digital display device, such as the DMD 105 of FIG. 1, will now be described with reference to FIG. 2 and FIG. 1. The DMD 105 has a typical frame period and in this example each frame period is divided into three subframes. Drawing commands, (representing lines or symbols) which are received on input line 102 are rendered and displayed every subframe (rendering cycle) under the control of the signal processor 101.

On a first rendering cycle (subframe 1 of frame 1), the DMD 105 is required to display three lines; Line A, Line B, Line C. At 201, the signal processor 101 receives the drawing commands representing the three lines. At 202 a tag (or persistency value) having a value of 3 is assigned to each drawing command. This means that these lines are to be displayed for 3 subframes, that is; one frame. Thus, in this example, the drawing commands can be represented as follows; Line A-3-start xa1,ya1 end xa2,ya2: Line B-3-start xb1,yb1 end xb1,yb1: Line C-3-start xc1,yc1 end xc2,yc2, with the number 3 in each case referring to the persistency value. At 203, these commands along with their assigned persistency values are stored. At 204, as the drawing commands for the lines A, B, and C all have persistency values greater than zero, the drawing commands for these lines are sent, by the signal processor 101, to the renderer 103. At 205, the lines A, B and C are rendered and subsequently displayed on the DMD 105 during this first subframe 1 of frame 1. At 206, the signal processor 101 decrements the persistency value assigned to the drawing commands for each of the lines A, B, C by 1 and at 207, stores the drawing commands representing lines A, B, C along with their revised persistency values (now equal to 2) in its store 106. The method now reverts to step 201 on the second subframe of frame 1.

At subframe 2 of frame 1, further drawing commands are received (at 201) representing three more lines to be drawn; Line D and Line E. At 202, a persistency value of 3 is assigned to the drawing commands representing these two lines. At 203, these newly received drawing commands representing Line D and Line E are stored along with their persistency values. These drawing commands can be represented as follows: Line D-3-start xd1yd1 end xd2,yd2: Line E-3-start xe1,ye1 end xe2,ye2. At 204, the signal processor 101 selects from the store 106 drawing commands with persistency values greater than zero. These comprise the commands representing lines D and E and also lines A, B and C which are now represented as; Line A-2-start xa1,ya1 end xa2,ya2: Line B-2-start xb1,yb1 end xb1,yb1: Line C-2-start xc1,yc1 end xc2,yc2. Thus, the lines which are rendered and displayed (at 205) in subframe 2 of frame 1 are lines A, B, C, D and E. At 206, the persistency values associated with lines A, B and C are decremented once more and will now have a value of 1 and the persistency values associated with lines D and E are decremented by 1 for the first time and will now have a value of 2. At 207 the drawing commands associated with lines A-E and their associated persistency values are re-stored.

At subframe 3 of frame 1 the method reverts to 201 where further drawing commands representing two further lines to be drawn; Line F and Line G are received. At 202, a persistency value of 3 is assigned to the drawing commands representing these two lines. At 203, these newly received drawing commands representing Line F and Line G are stored. These drawing commands can be represented as follows: Line F-3-start xf1,yf1 end xf2,yf2: Line G-3-start xg1,yg1 end xg2,yg2. At 204, the signal processor 101 selects from the store 106 drawing commands with persistency values greater than zero. These comprise the commands representing lines F and G and also lines D and E which are now represented as; Line D-2-start xd1yd1 end xd2,yd2: Line E-2-start xe1,ye1 end xe2,ye2 and also Line A-1-start xa1,ya1 end xa2,ya2: Line B-1-start xb1,yb1 end xb1,yb1: Line C-1-start xc1,yc1 end xc2,yc2. Thus, the lines which are rendered and displayed (at 205) in the third subframe of the first frame are lines A-G. Lines A-C have now been rendered and displayed for a whole frame. At 206, the persistency values associated with lines A, B and C are decremented once more and will now have a value of zero. The persistency values associated with lines D and E are decremented by 1 for the second time and will now have a value of 1. The persistency values associated with lines F and G are decremented by 1 for the first time and will now have a value of 2. At 207 the drawing commands associated with lines A-G and their associated persistency values are re-stored. As the drawing commands associated with the lines A-C now have persistency values of zero the signal processor can choose to discard these rather than restore them or just ignore them on subsequent subframes (at step 204).

Next is the commencement of a new frame so on the first subframe of the second frame, the method can revert to 201 where further drawing commands representing new lines Line H and Line I are received. The process continues in the same manner as described above through steps 202 to 207. At subframe 1 of frame 2 the lines D-I are rendered and displayed. At subframe 2 of frame 2 lines D and Line E-will have been rendered and displayed for a whole frame and their associated persistency values will have reached zero and therefore the drawing commands for these two lines can be discarded. The method continues as more drawing commands are received.

In an alternative embodiment, the signal processor 101 maintains a list of drawing commands in the store 106 and at step 207 updates the persistency value of each stored drawing command as appropriate. When the persistency value of a particular drawing command reaches zero, this drawing command can be deleted from the list.

Whereas example embodiments of the present invention have been described above in the context of a DMD device, the same techniques may be applied to the control of other types of digital display device. Further while the example embodiments have been described above with reference to drawing commands for lines, the method is equally applicable to drawing commands for symbols.

The invention claimed is:

1. A method for controlling a digital display device to display an image, the method comprising:
   on a first rendering cycle, receiving data representing an image to be displayed;
   assigning to said data, a tag having a value equal to a pre-determined integer that is higher than one;
   outputting said data for rendering and decrementing the value of the assigned tag by one; and
   on a second rendering cycle that occurs subsequent to the first rendering cycle, if the value of the assigned tag is greater than zero, outputting said data for re-rendering and further decrementing the value of the tag by one.

2. The method according to claim 1, further comprising discarding data having an assigned tag of value equal to zero.

3. The method according to claim 1, further comprising:
   storing received data and assigned tag values in a store; and
   selecting from the store received data having an assigned tag whose value is greater than zero for rendering or re-rendering.

4. The method according to claim 1, wherein the received data comprises image symbology data received as a drawing command representing a line, and the method further comprises rendering the output data and displaying the line on a visual display.

5. The method according to claim 1, wherein the visual display has a refresh (frame) period and the rendering cycle is a fraction of said refresh period.

6. The method according to claim 5, wherein the pre-determined integer is equal to the number of rendering cycles in a frame period.

7. A digital display apparatus comprising:
   a signal processor arranged to:
      on a first rendering cycle, receive data representing an image to be displayed;
      assign to said data, a tag having a value equal to a pre-determined integer;
      on the first rendering cycle, output said data for rendering and decrement the value of the assigned tag by one; and
      on a second rendering cycle that occurs subsequent to the first rendering cycle, in response to the assigned tag being greater than zero, output the data for re-rendering and further decrement the value of the tag by one.

8. The apparatus according to claim 7, wherein the signal processor includes a store for storing received data and assigned tag values, and wherein the signal processor is implemented in an integrated circuit.

9. A digital display system including the apparatus of claim 7.

10. A digital display device configured to:
    on a first rendering cycle, receive data representing an image to be displayed;
    assign to said data, a tag having a value equal to a pre-determined integer that is higher than one;
    output said data for rendering and decrement the value of the assigned tag by one; and
    on a subsequent rendering cycle, if the value of the assigned tag is greater than zero, output the data for re-rendering and further decrement the value of the tag by one.

11. The apparatus according to claim 7, further comprising a store for storing received data and assigned tag values.

12. The device according to claim 10, further comprising:
    discarding data having an assigned tag of value equal to zero;
    storing received data and assigned tag values in a store; and
    selecting from the store received data having an assigned tag whose value is greater than zero for rendering or re-rendering.

13. The device according to claim 10, wherein the received data comprises image symbology data received as a drawing command representing a line, and the method further comprises rendering the output data and displaying the line on a visual display, wherein the device further comprises a store for storing received data and assigned tag values.

14. The device according to claim 10, wherein the visual display has a refresh (frame) period and the rendering cycle is a fraction of said refresh period.

15. The device according to claim 14, wherein the pre-determined integer is equal to the number of rendering cycles in a frame period.

16. A digital display system including the device of claim 10.

17. The method of claim 1, further comprising:
    on a third rendering cycle that occurs subsequent to the second rendering cycle, if the value of the assigned tag is greater than zero, outputting said data for re-rendering and further decrementing the value of the tag by one.

18. The method of claim 1, further comprising:
    on each of one or more subsequent rendering cycles that occur subsequent to the second rendering cycle, iteratively outputting said data for re-rendering and further decrementing the value of the tag by one, until the value of the assigned tag becomes zero.

19. The apparatus according to claim 7, wherein the signal processor is arranged further to, on a third rendering cycle that occurs subsequent to the first and second rendering cycles, in response to the assigned tag being greater than zero, output the data for re-rendering and further decrement the value of the tag by one.

20. The device according to claim 10, wherein the number of rendering cycles in the frame period is greater than one.

* * * * *